(12) United States Patent
Kishii et al.

(10) Patent No.: US 8,399,114 B2
(45) Date of Patent: Mar. 19, 2013

(54) BATTERY MODULE

(75) Inventors: Daisuke Kishii, Osaka (JP); Takuya Nakashima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/386,814

(22) PCT Filed: Jul. 22, 2011

(86) PCT No.: PCT/JP2011/004137
§ 371 (c)(1),
(2), (4) Date: Jan. 24, 2012

(87) PCT Pub. No.: WO2012/014418
PCT Pub. Date: Feb. 2, 2012

(65) Prior Publication Data
US 2012/0189885 A1  Jul. 26, 2012

(30) Foreign Application Priority Data
Jul. 30, 2010  (JP) .................................. 2010-171635

(51) Int. Cl.
*H01M 2/12*  (2006.01)
*H01M 2/20*  (2006.01)

(52) U.S. Cl. ................ 429/82; 429/53; 429/72; 429/87; 429/88; 429/99

(58) Field of Classification Search .................... 429/53, 429/57, 72, 82, 87–89, 99, 100, 159
See application file for complete search history.

(56) References Cited

U.S. PATENT DOCUMENTS

| | | | |
|---|---|---|---|
| 5,643,691 | A  | 7/1997  | Iwatsuki et al. |
| 2005/0287426 | A1 | 12/2005 | Kim et al. |
| 2009/0202897 | A1 | 8/2009  | Kim et al. |
| 2010/0266880 | A1 | 10/2010 | Hirakawa et al. |
| 2011/0024207 | A1 | 2/2011  | Higashino et al. |
| 2011/0195284 | A1 | 8/2011  | Yasui et al. |

FOREIGN PATENT DOCUMENTS

| | | |
|---|---|---|
| JP | 07-245089  | 9/1995 |
| JP | 2004-335452 | 11/2004 |

(Continued)

OTHER PUBLICATIONS

International Search Report issued in International Patent Application No. PCT/JP2011/004137 dated Oct. 25, 2011.

*Primary Examiner* — Gregg Cantelmo

(74) *Attorney, Agent, or Firm* — McDermott Will & Emery LLP

(57) ABSTRACT

A battery module includes a first unit cell, a second unit cell, a first exhaust chamber, and a second exhaust chamber. The first unit cell is disposed so that a positive electrode terminal faces the first direction. The second unit cell is connected in series to the first unit cell, the negative electrode terminal is disposed so as to face the first direction, and the second unit is disposed so as to be adjacent to the first unit cell. The first exhaust chamber is disposed so as to face the positive electrode terminal of the first unit cell, and discharges a gas which is emitted from the positive electrode terminal of the first unit cell. The second exhaust chamber is disposed so as to face the positive electrode terminal of the second unit cell, and discharges a gas generated from the positive electrode terminal of the second unit cell. The end surface of the second unit cell in the first direction and the outer surface of the first exhaust chamber in the first direction are flush with each other. The end surface of the first unit cell in a second direction opposite to the first direction and the outer surface of the second exhaust chamber in the second direction are flush with each other.

10 Claims, 5 Drawing Sheets

FOREIGN PATENT DOCUMENTS

| | | |
|---|---|---|
| JP | 2006-012847 | 1/2006 |
| JP | 2007-027011 | 2/2007 |
| JP | 2009-123701 | 6/2009 |
| JP | 2009-277646 | 11/2009 |
| JP | 2010-135247 | 6/2010 |
| WO | WO 2009/110167 A1 | 9/2009 |
| WO | WO 2010/067602 A1 | 6/2010 |
| WO | WO 2011/033713 A1 | 3/2011 |

BATTERY MODULE

RELATED APPLICATIONS

This application is the U.S. National Phase under 35 U.S.C. §371 of International Application No. PCT/JP2011/004137, filed on Jul. 22, 2011, which in turn claims the benefit of Japanese Application No. 2010-171635, filed on Jul. 30, 2010, the disclosures of which Applications are incorporated by reference herein.

TECHNICAL FIELD

The present invention relates to a battery module in which plural unit cells are connected to each other, and particularly, to a battery module which includes a discharge mechanism which safely discharges a gas discharged from a positive electrode terminal of a unit cell to the outside of the battery module and connects plural unit cells in series to each other in a short distance.

BACKGROUND ART

A battery module which accommodates plural unit cells in a casing and outputs a predetermined voltage and capacity has been widely used as a power supply for various devices and vehicles. Among them, a battery module in which versatile unit cells are connected to each other in parallel and series and which outputs a predetermined voltage and capacity has been used for various purposes. A decrease in size and weight of the unit cell accommodated in the battery module has been progressed with the high performance. Thus, since the battery module may be decreased in size and weight, the workability when being assembled into the cell pack improves and a degree of freedom when being mounted into a restricted space of a vehicle or the like improves.

On the other hand, it is important to ensure the safety of the battery module as well as the safety of the unit cell with the high-performance of the unit cell accommodated in the battery module. In particular, when a gas is generated due to heat caused by internal short-circuiting or the like and a safety valve is operated so that the hot gas is discharged to the outside of the unit cell, the peripheral unit cell is exposed to the hot gas, which affects even the normal unit cell, so that a series of degradation may occur.

On the contrary, PTL 1 discloses a power supply device which defines a casing accommodating plural unit cells as a cell chamber accommodating the unit cells and a discharge chamber discharging a hot gas discharged from the unit cells by using a partition wall and which includes an exhaust mechanism allowing an opening portion of a safety valve of the unit cell to communicate with the exhaust chamber. With such a configuration, the hot gas discharged from the safety valve of the unit cell may be made to flow into the discharge chamber without flowing into the cell chamber, and may be discharged from the discharge port of the casing to the outside of the casing. Accordingly, the peripheral unit cell may be prevented from being exposed to the hot gas discharged from the abnormal unit cell, and the influence on the normal unit cell may be reduced.

However, in the power supply device disclosed in PTL 1, the plural unit cells are arranged so that the same electrodes face the same direction, and the exhaust chamber is disposed at one electrode. Thus, when the cell units each having plural unit cells connected in parallel to each other are connected in series to each other, a connection lead is needed which has a length corresponding to the length of the cell so as to connect the positive electrode and the negative electrode of the adjacent cell units, and the lead serves as a resistance in the current flowing path.

Further, when the plural cell units are arranged so that the positive electrode and the negative electrode are alternated and the exhaust chamber is provided for each opening portion of the safety valve of the unit cell, the exhaust chamber is provided at both electrode sides of the unit cell. Accordingly, the volume of the battery module increases, and the amount of electric power per unit volume of the battery module reduces.

CITATION LIST

Patent Literature

PTL 1: Japanese Patent Unexamined Publication No. 2007-027011

SUMMARY OF THE INVENTION

The invention provides a battery module capable of reducing a resistance of a current flowing path by connecting plural unit cells in series to each other in a distance set as small as possible while maximally suppressing an increase in volume due to an exhaust chamber.

A battery module of the invention includes a first unit cell, a second unit cell, a first exhaust chamber, and a second exhaust chamber. The first unit cell is disposed so that a positive electrode terminal faces the first direction. The second unit cell is connected in series to the first unit cell, the negative electrode terminal is disposed so as to face the first direction, and the second unit is disposed so as to be adjacent to the first unit cell. The first exhaust chamber is disposed so as to face the positive electrode terminal of the first unit cell, and discharges a gas which is emitted from the positive electrode terminal of the first unit cell. The second exhaust chamber is disposed so as to face the positive electrode terminal of the second unit cell, and discharges a gas generated from the positive electrode terminal of the second unit cell. The end surface of the second unit cell in the first direction and the outer surface of the first exhaust chamber in the first direction are flush with each other. The end surface of the first unit cell in a second direction opposite to the first direction and the outer surface of the second exhaust chamber in the second direction are flush with each other.

With this configuration, it is possible to maximally suppress an increase in volume due to the exhaust chamber and connect cell units, having plural unit cells connected in parallel to each other, in series to each other in a distance set as small as possible.

DESCRIPTION OF EMBODIMENTS

Figure 1:
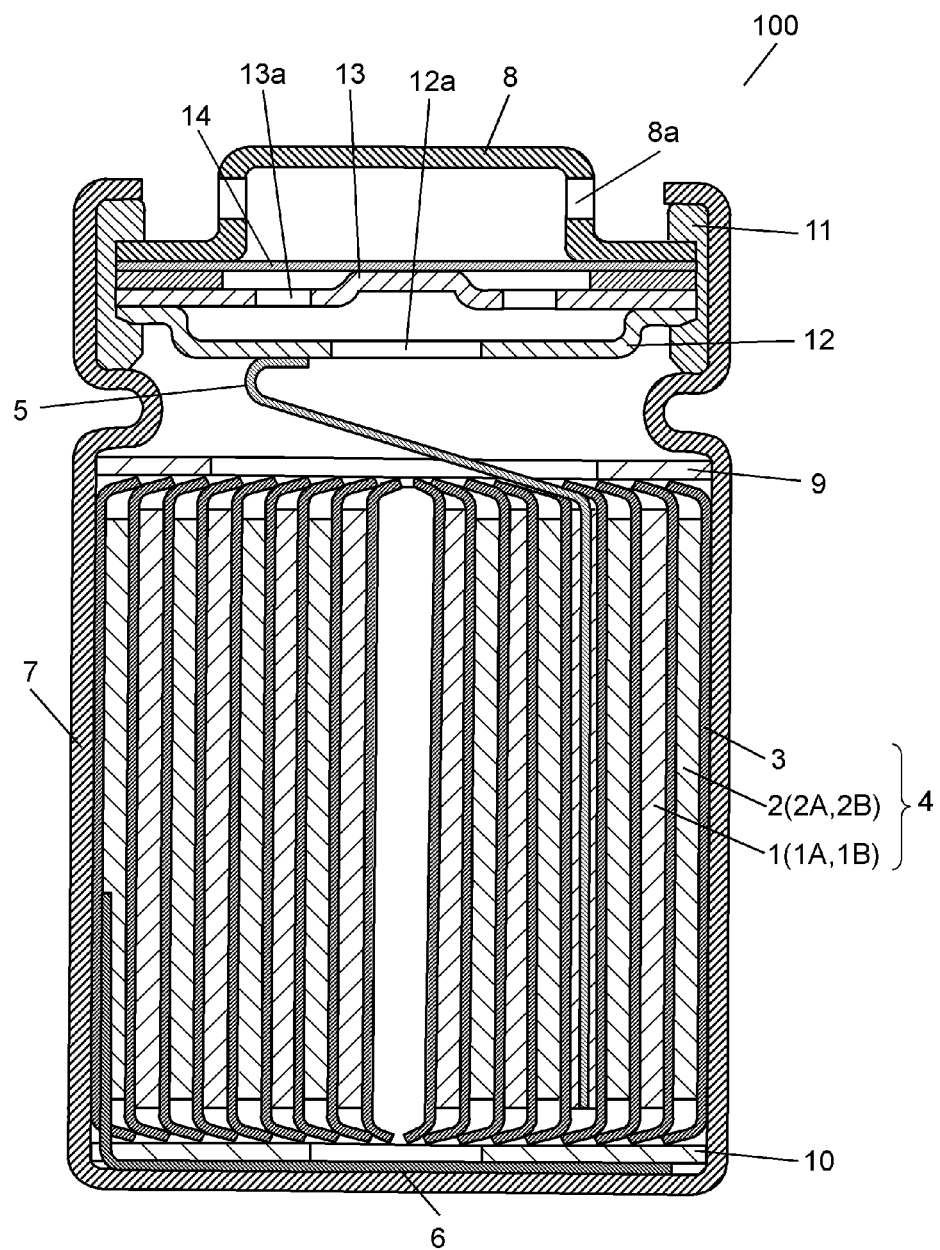
FIG. 1 is a cross-sectional view schematically showing the configuration of a unit cell which is used in a battery module according to an embodiment of the invention.

FIG. 1 is a cross-sectional view schematically showing the configuration of unit cell 100 which is used in a battery module according to an embodiment of the invention. Furthermore, the unit cell which is used in the battery module of the invention may be a unit cell which may be independently used as a power supply of a portable electronic apparatus such as a notebook computer. In this case, since a high-performance versatile cell may be used as the unit cell of the battery module, the high-performance battery module may be more easily obtained, and the cost thereof may be reduced.

As unit cell 100 which is used in the battery module, for example, a cylindrical lithium ion secondary cell shown in FIG. 1 may be employed. The lithium ion secondary cell has a general configuration, and includes a safety mechanism which discharges a gas accumulated in the cell when the pressure inside the cell increases due to occurrence of internal short-circuiting or the like. Hereinafter, referring to FIG. 1, the specific configuration of unit cell 100 will be described.

Unit cell 100 includes electrode group 4. Electrode group 4 is formed by winding positive electrode 1 and negative electrode 2 facing positive electrode 1 with separator 3 interposed therebetween. Positive electrode 1 is connected with, for example, lead 5 formed from aluminum (Al), and negative electrode 2 is connected with, for example, lead 6 formed from copper.

Electrode group 4 is inserted into casing 7 while insulating plates 9 and 10 are disposed on the upper and lower portions of electrode group 4. The end portion of lead 5 is bonded to filter 12, and the end portion of lead 6 is bonded to the bottom portion of casing 7 which serves as a negative electrode terminal. Furthermore, non-aqueous electrolyte (not shown) which conducts the lithium ion is injected into casing 7. That is, the non-aqueous electrolyte is impregnated in electrode group 4, and is interposed between positive electrode 1 and negative electrode 2.

Filter 12 is connected to inner cap 13, and the protrusion portion of inner cap 13 is bonded to metallic valve 14. Furthermore, valve 14 is connected to terminal plate 8 which serves as a positive electrode terminal. Then, terminal plate 8, valve 14, inner cap 13, and filter 12 are integrated with each other, and seal the opening portion of casing 7 through gasket 11.

When the pressure inside unit cell 100 increases due to the gas accumulated inside the cell in the event of the internal short-circuiting of unit cell 100 or the like, valve 14 expands toward terminal plate 8, so that the bonding between inner cap 13 and valve 14 is released. Accordingly, a current path is interrupted. Furthermore, when the pressure inside unit cell 100 increases, valve 14 is broken. Accordingly, the gas generated inside unit cell 100 is discharged to the outside of unit cell 100 through through-hole 12a of filter 12, through-hole 13a of inner cap 13, the gap of valve 14, and opening portion 8a of terminal plate 8.

Furthermore, the safety mechanism which discharges the gas generated inside unit cell 100 to the outside is not limited to the structure shown in FIG. 1, but may be different structures.

Positive electrode 1 includes collector 1A and positive electrode layer 1B which contains a positive electrode active material. Positive electrode layer 1B contains, for example, $LiCoO_2$, $LiNiO_2$, $Li_2MnO_4$, or a lithium-containing composite oxide of a mixture or a complex compound thereof as the positive electrode active material. Positive electrode layer 1B further contains a conductive agent or a bonding agent. As the conductive agent, for example, graphite such as natural graphite or artificial graphite or carbon blacks such as acetylene black, ketjen black, channel black, furnace black, lamp black, or thermal black may be used. Further, as the bonding agent, for example, polyvinylidene fluoride, polytetrafluoroethylene, polyethylene, polypropylene, aramid resin, polyamide, polyimide, or the like may be used. As collector 1A, Al, carbon, conductive resin, or the like may be used.

As the non-aqueous electrolyte, electrolyte solution formed by dissolving solute in organic solvent or so-called polymer electrolyte formed by making such solution a non-liquid state as a polymer may be employed. As the solute of the non-aqueous electrolyte, $LiPF_6$, $LiBF_4$, $LiClO_4$, $LiAlCl_4$, $LiSbF_6$, $LiSCN$, $LiCF_3SO_3$, $LiN(CF_3CO_2)$, $LiN(CF_3SO_2)_2$, or the like may be used. As the organic solvent, for example, ethylene carbonate, propylene carbonate, butylene carbonates, vinylene carbonate, dimethyl carbonate, diethyl carbonate, ethyl methyl carbonate, or the like may be used.

Negative electrode 2 includes collector 2A and negative electrode layer 2B which contains a negative electrode active material. As collector 2A, a metal foil of stainless steel, nickel, copper, titanium, or the like, a thin film of conductive resin, or the like is used. As the negative electrode active material contained in negative electrode layer 2B, a carbon material such as graphite may be used. Alternatively, a material such as silicon or tin or oxides thereof may be used of which the theoretical density of volume reversely absorbing and discharging lithium ion exceeds 833 $mAh/cm^3$. As described above, since lead 6 is connected to the inner bottom surface of casing 7, the outer bottom surface of casing 7 serves as a negative electrode terminal.

Figure 2:
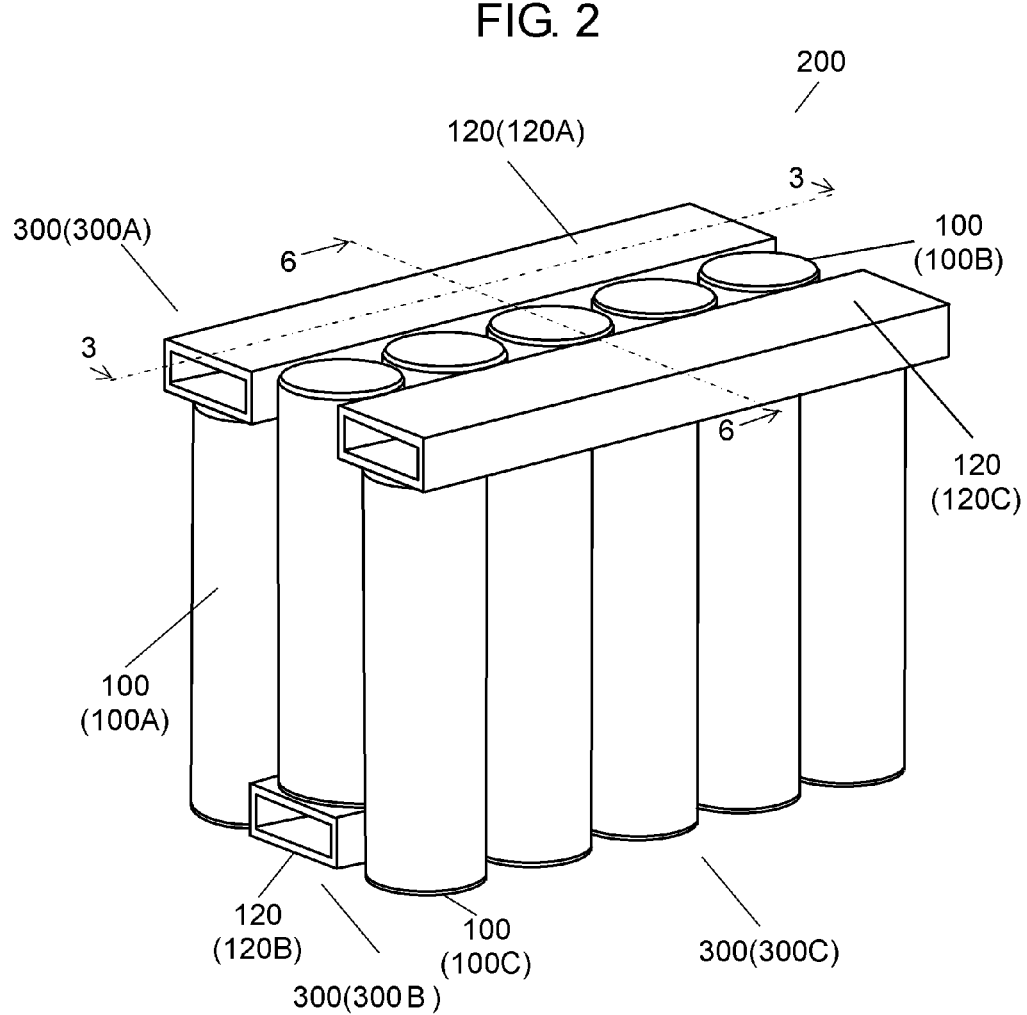
FIG. 2 is a perspective view schematically showing the configuration of the battery module according to the embodiment of the invention.
Figure 2:
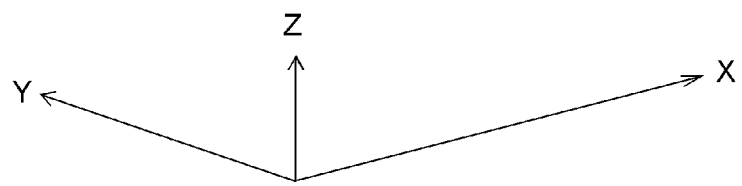

FIG. 2 is a perspective view schematically illustrating the configuration of battery module 200 according to the embodiment of the invention. Battery module 200 forms cell unit 300 (300A) in which five unit cells 100 (100A) are arranged in the X direction and connected in parallel to each other. Then, plural cell units 300A to 300C including cell unit 300A are arranged in the Y direction. At that time, cell unit 300B of which the negative electrode terminal is disposed so as to face the Z direction is disposed near cell unit 300A of which the positive electrode terminal is disposed so as to face the Z direction. That is, cell unit 300A with the positive electrode disposed so as to face the Z direction and cell unit 300B with the negative electrode terminal disposed so as to face the Z direction are alternately and adjacently arranged.

Exhaust chambers 120 (120A to 120C) respectively extending in the X direction are arranged so as to face the positive electrode terminals of unit cells 100A to 100C of respective cell units 300A to 300C. At this time, opening portion 8a provided in the positive electrode terminal also faces exhaust chamber 120. At that time, the end surface of unit cell 100B in the Z direction of one adjacent cell unit, for example, cell unit 300B and the outer surface of exhaust chamber 120A facing other cell unit 300A in the Z direction are arranged so as to be flush with each other. That is, exhaust chamber 120 is disposed at the side surface of casing 7 near the negative electrode of unit cell 100.

In other words, the end surface of unit cell 100B at the side of the negative electrode terminal is disposed so as to be shifted from the end surface of unit cell 100A at the side of the positive electrode terminal by a predetermined height in the Z direction. Then, exhaust chamber 120A is disposed so as to be included in the range of the predetermined height.

In the same way, the end surface of unit cell 100A of one adjacent cell unit 300A in the reverse Z direction and the outer surface of exhaust chamber 120B facing other cell unit 300B in the reverse Z direction are arranged so as to be flush with each other.

In other words, the end surface of unit cell 100A at the side of the negative electrode terminal is disposed so as to be deviated from the end surface of unit cell 100B at the side of the positive electrode terminal by a predetermined height in the reverse Z direction. Then, exhaust chamber 120B is disposed so as to be included in the range of the predetermined height.

With such an arrangement, the volume efficiency may be improved and the smaller battery module may be obtained in the case where the exhaust chamber is disposed at the positive electrode side of each of cells alternately arranged, that is, both end sides of the battery module.

Figure 3:
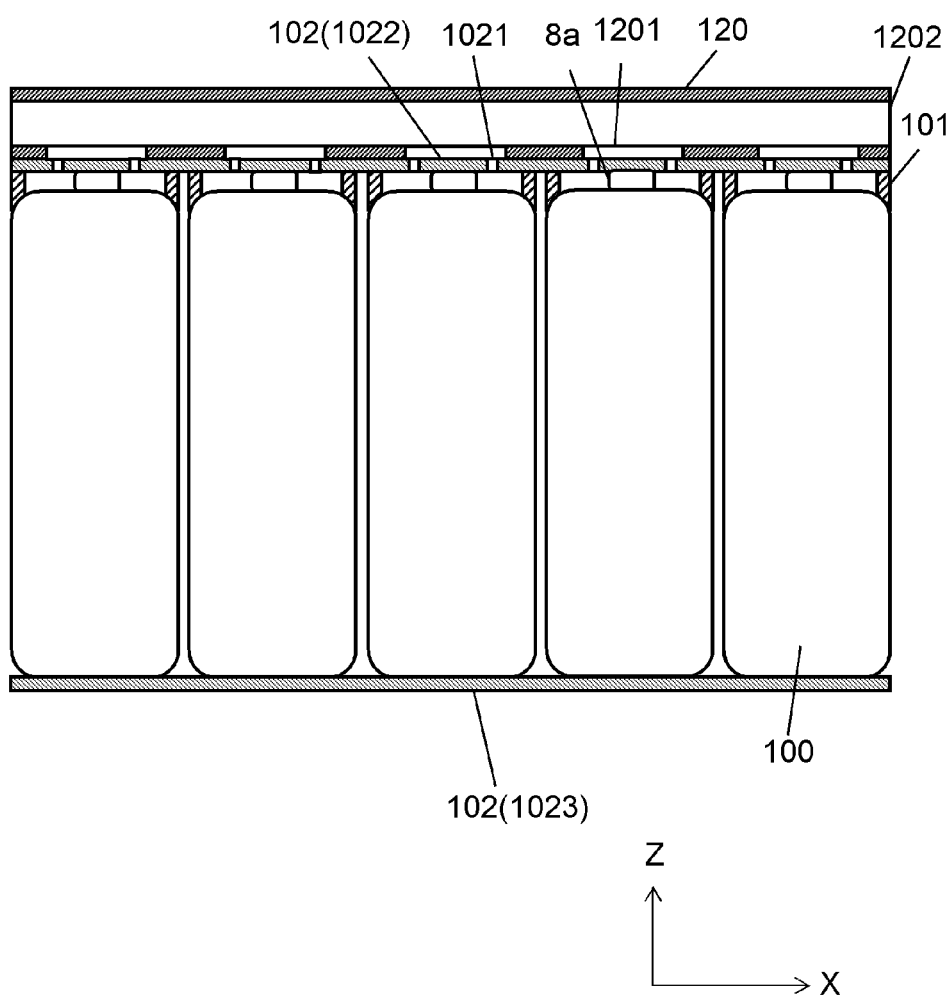
FIG. 3 is a cross-sectional view taken along the line 3-3 of FIG. 2.

Referring to FIG. 3, the connection method between unit cell 100 and exhaust chamber 120 and the parallel connection structure of battery module 200 will be described. FIG. 3 is a cross-sectional view taken along the line 3-3 of FIG. 2.

Ring 101 is bonded to the outer peripheral portion of the end surface of unit cell 100 at the side of the positive electrode terminal. Ring 101 is formed from resin.

Lead plate 102 is provided so as to cover the positive electrode side of ring 101 and unit cell 100. Lead plate 102 is air-tightly connected to ring 101, and is electrically connected to the top surface of terminal plate 8 as the positive electrode terminal. In the same way, parallel plural unit cells 100 are respectively connected electrically to lead plate 102, so that plural unit cells 100 are electrically connected in parallel to each other. Lead plate 102 is formed of Ni or the like.

Hollow box-like exhaust chamber 120 is disposed above lead plate 102. Further, exhaust chamber 120 and lead plate 102 are air-tightly connected to each other. Exhaust chamber 120 is formed from metal.

Figure 4:
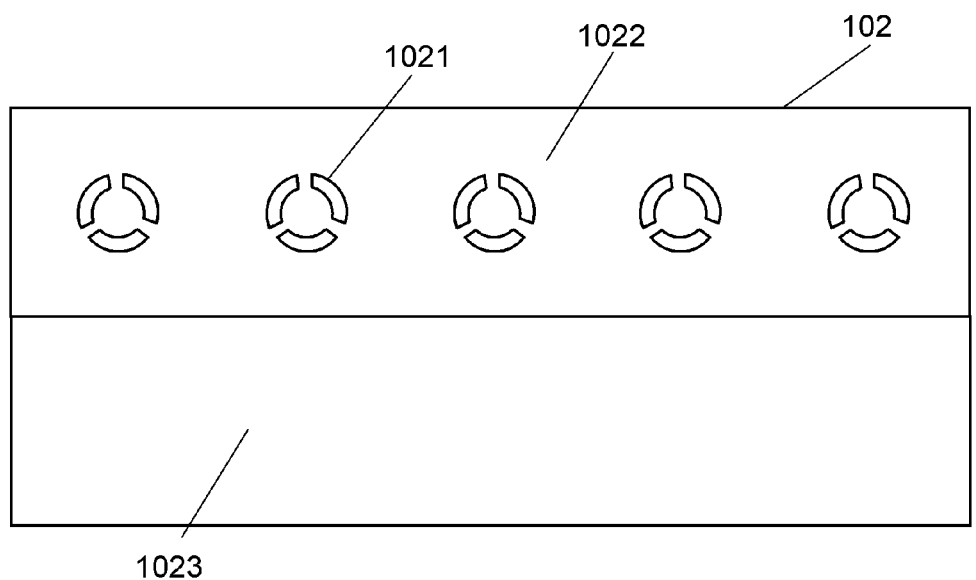
FIG. 4 is a plan view of a lead plate according to the embodiment of the invention.
Figure 5:
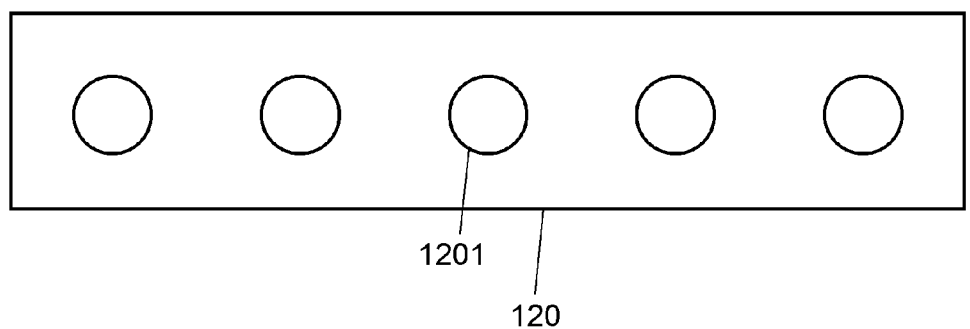
FIG. 5 is a plan view of an exhaust chamber according to the embodiment of the invention.

Next, a mechanism which discharges a gas to the outside of battery module 200 when the gas is discharged from unit cell 100 will be described in detail by referring to FIGS. 3, 4, and 5. FIG. 4 is a plan view of lead plate 102 according to the embodiment of the invention. FIG. 5 is a plan view of exhaust chamber 120 according to the embodiment of the invention.

As shown in FIG. 4, through-hole 1021 is provided at a position facing the positive electrode terminal of unit cell 100 in lead plate 102. Through-hole 1021 includes, for example, plural holes along the outer periphery of the positive electrode terminal. At this time, lead plate 102 and the positive electrode terminal are electrically connected to each other at the inner portion of through-hole 1021.

Further, lead plate 102 includes positive electrode-side connection portion 1022 which is connected to the positive electrode terminal of unit cell 100 and negative electrode-side connection portion 1023 which is connected to the negative electrode terminal of unit cell 100.

Further, as shown in FIG. 5, through-hole 1201 is provided at a position facing through-hole 1021 of lead plate 102 in exhaust chamber 120.

In such a configuration, when a gas is accumulated inside unit cell 100 due to the internal short-circuiting or the like, the gas is discharged from opening portion 8a into a space which is surrounded by unit cell 100, ring 101, and lead plate 102. Then, the gas is discharged into exhaust chamber 120 through through-hole 1021 of lead plate 102 and through-hole 1201 of exhaust chamber 120. Consequently, the gas is discharged from exhaust port 1202 of exhaust chamber 120 to the outside of battery module 200.

Furthermore, discharge port 1202 may be directly opened to the outside of battery module 200 or may be connected to a separately installed exhaust pipe.

Figure 6:
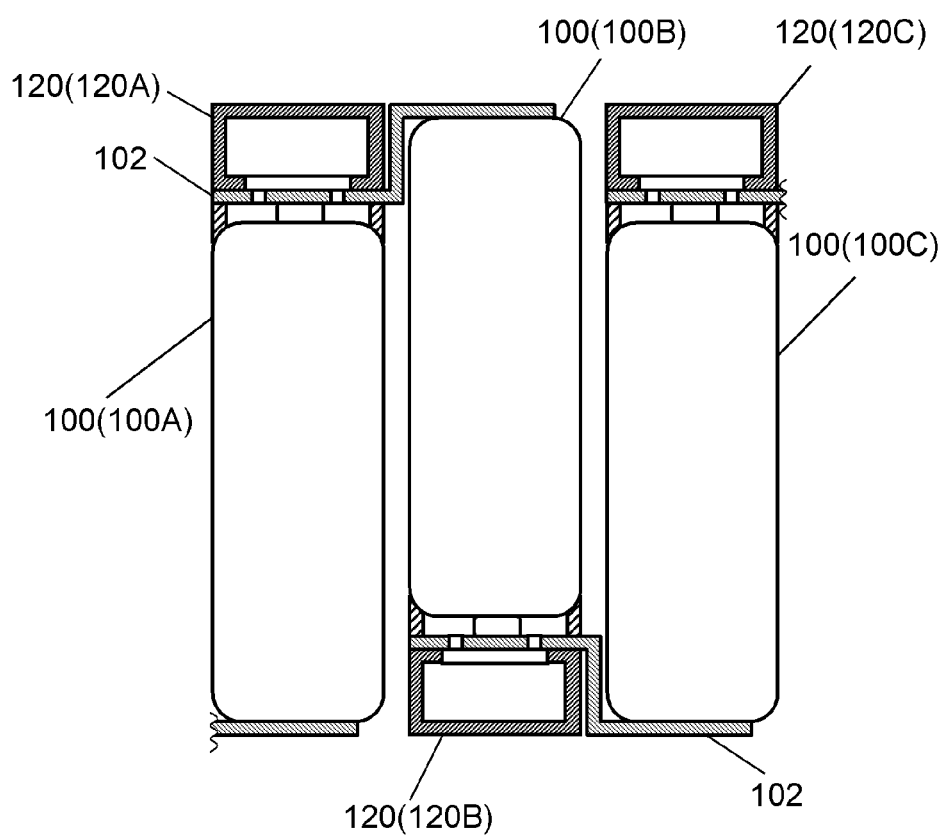
FIG. 6 is a cross-sectional view taken along the line 6-6 of FIG. 2.

Referring to FIG. 6, the serial connection structure between unit cells 100 of adjacent cell unit 300 will be described in more detail. FIG. 6 is a cross-sectional view taken along the line 6-6 of FIG. 2.

Adjacent unit cells 100, for example, unit cell 100A and unit cell 100B are connected in series to each other.

One end side of lead plate 102 is disposed between unit cell 100A and exhaust chamber 120A, and is connected to the positive electrode terminal. Further, the other end side of lead plate 102 extends from the gap between unit cell 100A and exhaust chamber 120A, is disposed so as to face the negative electrode terminal of adjacent unit cell 100B, and is connected to the negative electrode terminal. Lead plate 102 is bent so as to follow the positive electrode terminal of unit cell 100A and the negative electrode terminal of unit cell 100B.

In the same way, unit cell 100B and unit cell 100C are connected in series to each other by lead plate 102.

In this way, unit cells 100A to 100C are connected in series to each other. Furthermore, the other end side of lead plate 102 connected to the negative electrode terminal of unit cell 100A is connected to, for example, a negative electrode-side extraction electrode (not shown). In the same way, the other end side of lead plate 102 connected to the positive electrode terminal of unit cell 100C is connected to a positive electrode-side extraction electrode (not shown).

As shown in FIG. 6, when lead plate 102 is provided so as to face the negative electrode terminal of unit cell 100B, the outer surface of exhaust chamber 120A disposed to face the positive electrode terminal of unit cell 100A in the Z direction is flush with the outer surface of lead plate 102 disposed to face the negative electrode terminal of unit cell 100B in the Z direction. That is, the end surface of unit cell 100B in the Z direction is formed as the outer surface of lead plate 102 in the Z direction.

Furthermore, lead plate 102 may not necessarily have the shape and the connection method shown in FIG. 6, and may have a configuration in which the positive electrode and the negative electrode of adjacent unit cells 100 are connected to each other. For example, the side surface of casing 7 may be exposed from the insulating member such as halon of casing 7 near the negative electrode of unit cell 100, and lead plate 102 may be electrically connected to casing 7 near the negative electrode of unit cell 100. In this case, lead plate 102 may not necessarily be configured to face the negative electrode terminal of unit cell 100.

Further, in the embodiment, battery module 200 has been described in which three cell units 300 each includes five unit cells 100 connected in parallel to each other, but the number of the unit cells connected in series and in parallel to each other is not limited thereto. Even in a configuration in which at least two unit cells 100 are connected in series to each other (one parallel and two series), the effect of the invention is obtained.

According to such a configuration, since the negative electrode-side surface of unit cell 100 and the outer surface of exhaust chamber 120 in the same direction are arranged so as to be flush with each other, an increase in volume of battery module 200 due to exhaust chamber 120 may be maximally suppressed. Further, a resistance of a current flowing path may be reduced by connecting plural unit cells 100 in series to each other in a distance set as small as possible.

INDUSTRIAL APPLICABILITY

The battery module of the invention is useful as a power supply of an automobile, an electric motorcycle, electric playground equipment or the like.

The invention claimed is:

1. A battery module comprising:
a first unit cell that has a positive electrode terminal disposed so as to face a first direction;
a second unit cell that is connected in series to the first unit cell, has a negative electrode terminal disposed so as to face the first direction, and is disposed adjacent to the first unit cell;
a first exhaust chamber that is disposed so as to face the positive electrode terminal of the first unit cell and discharges a gas emitted from the positive electrode terminal of the first unit cell;
a second exhaust chamber that is disposed so as to face a positive electrode terminal of the second unit cell and discharges a gas generated from the positive electrode terminal of the second unit cell; and
a lead plate that electrically connects the positive electrode terminal of the first unit cell and the negative electrode terminal of the second unit cell to each other,
wherein an end surface of the second unit cell in the first direction and an outer surface of the first exhaust chamber in the first direction are flush with each other,
wherein an end surface of the first unit cell in a second direction opposite to the first direction and an outer surface of the second exhaust chamber in the second direction are flush with each other,
wherein one end of the lead plate is disposed between the positive electrode terminal of the first unit cell and the exhaust chamber so as to face the positive electrode terminal,
wherein the other end of the lead plate is disposed so as to face the negative electrode terminal of the second unit cell, and
wherein the negative electrode-side end surface of the second unit cell is formed by an outer surface of the other end of the lead plate in the first direction.

2. The battery module of claim 1,
wherein the lead plate is bent so as to follow the positive electrode terminal of the first unit cell and the negative electrode terminal of the second unit cell.

3. The battery module of claim 1,
wherein the lead plate includes a through-hole at a position facing the positive electrode terminal,
wherein the first exhaust chamber includes a through-hole at a position facing the through-hole of the lead plate, and
wherein the gas emitted from the positive electrode terminal is discharged to the first exhaust chamber through the through-hole of the lead plate and the through-hole of the first exhaust chamber.

4. The battery module of claim 3,
wherein the through-hole of the lead plate is a plurality of holes along the outer periphery of the positive electrode terminal, and
wherein the positive electrode terminal is electrically connected to the lead plate at an inner portion in relation to the plurality of holes of the lead plate.

5. A battery module comprising:
a first unit cell that has a positive electrode terminal disposed so as to face a first direction;
a second unit cell that is connected in series to the first unit cell, has a negative electrode terminal disposed so as to face the first direction, and is disposed adjacent to the first unit cell;
a first exhaust chamber that is disposed so as to face the positive electrode terminal of the first unit cell and discharges a gas emitted from the positive electrode terminal of the first unit cell; and
a second exhaust chamber that is disposed so as to face a positive electrode terminal of the second unit cell and discharges a gas generated from the positive electrode terminal of the second unit cell,
wherein an end surface of the second unit cell in the first direction and an outer surface of the first exhaust chamber in the first direction are flush with each other,
wherein an end surface of the first unit cell in a second direction opposite to the first direction and an outer surface of the second exhaust chamber in the second direction are flush with each other,
wherein a plurality of first unit cells are provided and arranged along a third direction and are connected electrically in parallel to each other,
wherein the first exhaust chamber is provided in parallel with the third direction,
wherein a plurality of second cells are provided,
wherein the battery module further comprises a lead plate that electrically connects the positive electrode terminals of the plurality of first unit cells and the negative electrode terminal of the plurality of second unit cells to each other,
wherein one end of the lead plate is disposed between the positive electrode terminals of the plurality of first unit cells and the exhaust chamber so as to face the positive electrode terminals,
wherein the other end of the lead plate is disposed so as to face the negative electrode terminals of the plurality of second unit cells,
wherein the lead plate connects the plurality of first unit cells in parallel to each other,
wherein the lead plate connects the plurality of second unit cells in parallel to each other, and
wherein the negative electrode-side end surface of the second unit cell is formed by an outer surface of the other end of the lead plate in the first direction. unit cell is formed by an outer surface of the other end of the lead plate in the first direction.

6. A battery module comprising:
a first unit cell that has a positive electrode disposed so as to face a first direction;
a second unit cell that is connected in series to the first unit cell, has a negative electrode disposed so as to face the first direction, and is disposed adjacent to the first unit cell;
a first exhaust chamber that is disposed so as to face the positive electrode terminal of the first unit cell and discharges a gas emitted from the positive electrode terminal of the first unit cell; and
a second exhaust chamber that is disposed so as to face the positive electrode terminal of the second unit cell and discharges a gas generated from the positive electrode terminal of the second unit cell,
wherein the second unit cell is disposed so that the negative electrode-side end surface is shifted from the positive electrode-side end surface of the first unit cell by a predetermined height in the first direction, and the first exhaust chamber is disposed so as to be included in a range of the predetermined height, and
wherein the second unit cell is disposed so that the positive electrode-side end surface is shifted from the negative electrode-side end surface of the first unit cell by a predetermined height in the first direction, and the second exhaust chamber is disposed so as to be included in a range of the predetermined height.

7. A battery module comprising:

a first unit cell that has a positive electrode terminal disposed so as to face a first direction;

a second unit cell that is connected in series to the first unit cell, has a negative electrode terminal disposed so as to face the first direction, and is disposed adjacent to the first unit cell;

a first exhaust chamber that is disposed so as to face the positive electrode terminal of the first unit cell and discharges a gas emitted from the positive electrode terminal of the first unit cell; and a second exhaust chamber that is disposed so as to face a positive electrode terminal of the second unit cell and discharges a gas generated from the positive electrode terminal of the second unit cell, wherein an end surface of the second unit cell in the first direction and an outer surface of the first exhaust chamber in the first direction are flush with each other, wherein an end surface of the first unit cell in a second direction opposite to the first direction and an outer surface of the second exhaust chamber in the second direction are flush with each other, wherein a plurality of first unit cells are provided and arranged along a third direction and are connected electrically in parallel to each other, wherein the first exhaust chamber is provided in parallel with the third direction, wherein the battery module further comprises a lead plate that electrically connects the positive electrode terminal of the first unit cell and the negative electrode terminal of the second unit cell to each other, wherein one end of the lead plate is disposed between the positive electrode terminal of the first unit cell and the exhaust chamber so as to face the positive electrode terminal, wherein the other end of the lead plate is disposed so as to face the negative electrode terminal of the second unit cell, and wherein the negative electrode-side end surface of the second unit cell is formed by an outer surface of the other end of the lead plate in the first direction.

8. The battery module of claim 7, wherein the lead plate is bent so as to follow the positive electrode terminal of the first unit cell and the negative electrode terminal of the second unit cell.

9. The battery module of claim 7, wherein the lead plate includes a through-hole at a position facing the positive electrode terminal, wherein the first exhaust chamber includes a through-hole at a position facing the through-hole of the lead plate, and wherein the gas emitted from the positive electrode terminal is discharged to the first exhaust chamber through the through-hole of the lead plate and the through-hole of the first exhaust chamber.

10. The battery module of claim 9, wherein the through-hole of the lead plate is a plurality of holes along the outer periphery of the positive electrode terminal, and wherein the positive electrode terminal is electrically connected to the lead plate at an inner portion in relation to the plurality of holes of the lead plate.

* * * * *